Oct. 23, 1951 A. JAGERSBERGER 2,572,488
APPARATUS FOR THE MEASUREMENT OF TEMPERATURE BY COLOR COMPARISON
Filed Feb. 26, 1948
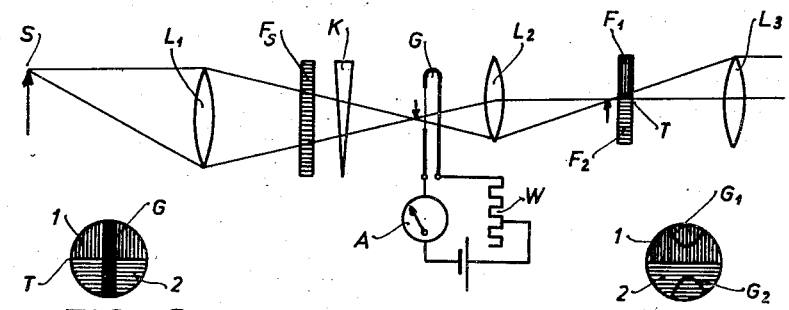
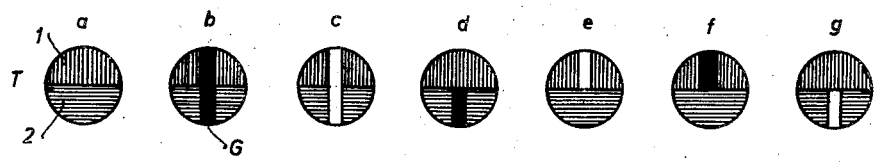
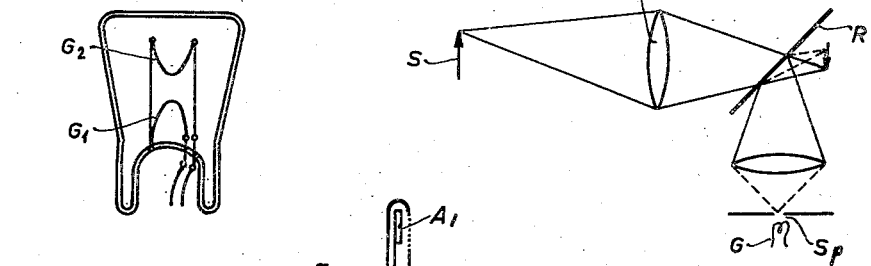
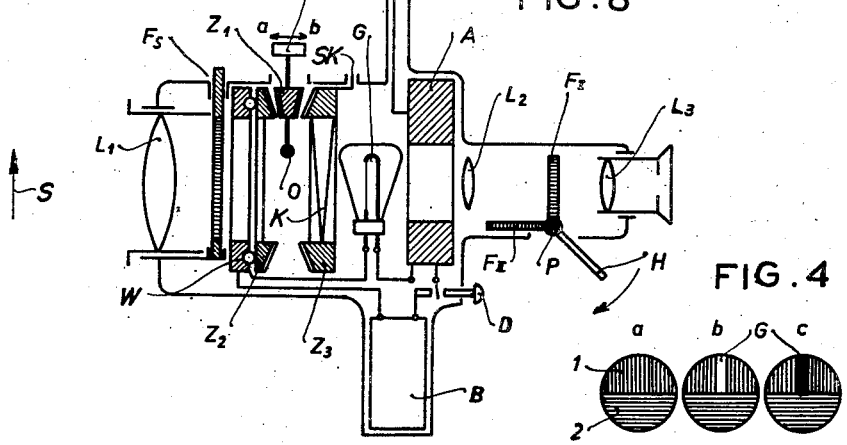

Patented Oct. 23, 1951

2,572,488

UNITED STATES PATENT OFFICE 2,572,488

APPARATUS FOR THE MEASUREMENT OF TEMPERATURE BY COLOR COMPARISON

Adolf Jagersberger, Saint Gilgen, Austria

Application February 26, 1948, Serial No. 11,292
In Austria February 4, 1947

Section 1, Public Law 690, August 8, 1946
Patent expires February 4, 1967

1 Claim. (Cl. 88—22.5)

This invention relates to apparatus for the subjective measurement of colour temperature and colour emission properties. The methods hitherto in use for measuring colour temperature have a number of drawbacks. In the case of the oldest method, based on a colour comparison between the radiator being measured and a comparative light source, exact colour comparison is very difficult to carry out with industrial instruments, as slight differences in colour, such as occur in these measurements, where the surroundings are those of a factory cannot be ascertained with the requisite accuracy. A further shortcoming of this process is that only an eye trained in colours can read off the correct measurement values; indeed a large number of persons have eyes that deviate from the normal spectral curve of optical sensitivity. Measurement with such instruments is moreover difficult to perform in that the direction in which the colour-changing setting device has to be moved cannot be discerned without difficulty, so that this has to be ascertained by trial and error. Since in addition to a colour comparison, the luminous intensity also has to be matched, in this process two matching devices have to be moved until the same colour and luminosity is shown in the comparative fields as is not compatible with the demand for a short measuring period.

Colour pyrometers have therefore already been put forward which work on the principle of comparative luminosity with two different spectral colours. Here the luminosity ratio, which constitutes the standard for the colour temperature, is read off from two electric resistances, so that the difference between the settings of the two resistance slides can then be calibrated direct according to the colour temperatures. This process avoids direct colour comparison and thereby makes colour temperature measurement independent of the colour training of the eye, but its drawback consists in the temperature measurement taking place by means of two consecutive luminosity comparisons, and thus, after the completion of the second measurement and passing over to the first spectral range, it is only then possible to ascertain whether the temperature or the emission properties of the radiators have changed; this would entail an incorrect measurement of the colour temperature. In the measurement of radiators, whose temperature and emission properties do not altogether remain constant during the measuring period, incorrect measurements are obtained by this process, the extent of the measuring errors increasing steeply with changes in the rate of these components.

Another measuring process, which likewise works on the luminosity principle, consists in the luminosity of the radiator, with a spectral colour having a light attenuation device, being matched to the luminosity of a comparative source of light shining with constant intensity. If the luminosity for another spectral colour is then equalised with a light attenuation device used in addition to the former one, the position of this light attenuation device constitutes a direct gauge of the colour temperature of the radiator. Compared with direct colour comparison, this process has the advantage that any lack of training of the observer's eye is without effect on the accuracy of measurement, but here again there is the drawback of consecutive measurement in two different ranges of colour, with the unreliability associated therewith, as explained above.

The accuracy of colour temperature determinations by means of pyrometers working on the luminosity principle is further lessened on account of the circumstance that the temperature of colour of the comparative light source does not agree during matching with that of the radiator. The consequence of this is that while the luminosity is accurately matched, there is a difference in colour between the radiator and the comparative source of light, which reduces the accuracy of the luminosity comparison and is conspicuous during measurement because the image of the comparative source of light cannot, or cannot altogether, be caused to disappear in the background formed by the radiator. Contrast sensitivity is thereby lessened, and therefore the accuracy of the colour temperature determination, which is proportional to contrast sensitivity.

The invention aims at avoiding the defects of the colour temperature measuring methods hitherto known and at increasing the accuracy of colour temperature determination. It is characterised by the following features:

(a) By filtering the rays emitted or by the spectral analysis of the light, two differently coloured images of the radiator are produced.

(b) In each of these coloured images of the radiator, an image or partial image of a common source of temperature light is made visible in the colour corresponding to the coloured image of the radiator.

(c) In each of the two colours, equality of luminous intensity between radiator and comparative light source is produced by the colour temperature of the comparative source of light and the absolute luminous intensity of the radiator (by means of a light attenuation device keeping the luminosity intensity ratio of the two coloured images constant) being altered and (d) From the colour temperature setting of the comparative source of light, the colour temperature of the radiator is obtained, and from the light attenuation setting the colour emission properties of the radiator.

The invention moreover relates to an apparatus for carrying out this method.

In the accompanying drawing,

Fig. 1 shows diagrammatically the chief features of the invention,

Figs. 2 to 4 show the measuring fields in the different stages,

Fig. 5 shows a modified form of constructing the incandescent filament,

Fig. 6 shows the image appearing with this method of carrying the invention into practice, Fig. 7 is a schematic representation of a modified form of construction with reflection of the comparative light source, and Fig. 8 shows a cross-section through the fundamental layout of an apparatus constructed according to the invention.

In Fig. 1, S represents the temperature radiator which, by means of a lens $L_1$, is reproduced on the normal plane to the optical axis through the incandescent wire G, via a neutral light-attenuation device, denoted in the figure as grey wedge K. A lens $L_2$ projects the image of the radiator S and the incandescent filament G on to two light filters $F_1$ and $F_2$ which meet to form a sharp separating edge T; these filters separate out the desired spectral ranges. Through the eyepiece $L_3$ it is then possible to see the incandescent filament G (as shown in Fig. 2) through the two differently coloured halves 1 and 2 of the field of vision, which are illuminated by the light of the radiator being measured. The temperature of the incandescent filament G may be adjusted by means of a variable resistance W. A galvanometer A, which measures the current flowing through the incandescent filament G, may be calibrated direct according to the colour temperatures, since the current, which flows through the incandescent filament, is a standard for its colour temperature. On the other hand, the light attenuation device K, which brings into agreement the colour emission properties of the radiator S with those of the incandescent filament G, may be calibrated according to its emission properties. If the colour temperature of the incandescent filament G is matched by the variable resistance W with that of the radiator S, and if the luminous intensities of the radiator and the incandescent filament are matched to one another with the aid of the light attenuation device K, the image of the incandescent filament G disappears in both the differently coloured halves 1 and 2 of the field of vision, as indicated in Fig. 3a. After correctly equalising the luminous intensity, which can be recognised by looking through the eyepiece and is shown in the equalised state in Fig. 3a, the colour temperature and the emission properties of the radiator can be read directly off on the matching devices A and K.

If the colour temperature of the incandescent filament G has been correctly set, the image shown in Fig. 3b appearing in the eyepiece will change into that shown in Fig. 3a or 3c, or vice versa, if the light attenuation K is altered; thus the incandescent filament always appears simultaneously in both halves of the field of vision darker than, equally as bright as or brighter than the background formed by the radiator S.

If the colour temperature of the incandescent filament G has been incorrectly set, there will occur with changes in the light attenuation K in the eyepiece, in sequence, the equalised states Figs. 3b, 3d, 3e and 3c or vice-versa, 3b, 3f, 3g and 3c respectively, according to whether the colour temperature of the incandescent filament G was set higher or lower than that of the radiator S. In this case, therefore, when the light attenuation is altered (K) the incandescent filament will never disappear simultaneously in both halves of the field of vision 1 and 2.

In the practical design of a pyrometer working according to this invention, where low colour temperatures are concerned, work will be carried out for instance with the spectral colours red and green, and for temperature adjustment, the procedure should for preference be as follows: The colour temperature of the incandescent filament G is set to any value, or better still, to an estimated value, and equalised with the light attenuation device K first of all in the red half of the field of vision. If the incandescent filament disappear with green (Fig. 4a), the colour temperature of the radiator may be read off the indicating instrument (Fig. 1). However, if the incandescent filament with green is brighter than the radiator, as shown in Fig. 4, the colour temperature of the incandescent filament G has been set too high and must be reduced by altering the matching device W. Further actuation of the light attenuation K, whereby equalisation is again carried out with red, shows whether equality of luminosity has not been reached for green as well, i. e. whether the colour temperature has been correctly set. However, if the field with green, after red equalisation, is found to be as in Fig. 4c, so that the incandescent filament G appears darker than the radiator S, the colour temperature of the incandescent filament G must be increased, whereupon equalisation is again carried out with the light attenuation device K for red. In this manner the reciprocal equalisations are repeated by operating W and K, until with red and green, equality of luminosity is set up between the incandescent filament and the radiator. In practical colour temperature measurement, the equalisation point is reached in two to three stages. The equalised states which actually occur are therefore reduced, according to Fig. 4 to a total of three, if temperature measurement is carried out in the manner described.

One advantage of this method resides in the fact that the direction in which the colour temperature of the source of comparative light should be altered during measurement is clearly determined by the equalised image visible in the eyepiece. It is not therefore obligatory, as in the comparative colour methods, to ascertain the direction of the equalising method by trial and error.

If several measurements have to be carried out on the same radiator, for all further equalisations after the first temperature measurement only the colour temperature of the incandescent filament has to be set, as the coefficient of emission of the radiator, set during the first measurement with the light attenuation device, generally remains unchanged. For colour temperature measurement in these cases, only the one matching device W has to be varied. It is then quite as simple to obtain the colour temperature as it is to measure the black body temperature with the usual partial radiation pyrometers. In this manner it is possible to ascertain once and for all the coefficients of emission for the different special radiators, and then it is always possible to obtain the colour temperature by the simplest means by moving a single setting device W (Fig. 1), if before the measurement, the light attenuation device K is set to the known coefficient of emission of the radiator.

In lieu of a straight extended incandescent filament G, forming the basis of Figs. 1 to 4, it is of course possible to use luminous filaments of other kinds, e. g. two filaments $G_1$ and $G_2$ as in Fig. 5, which are bent in the usual way and connected up electrically in series. In this case a field of vision will be obtained as shown in Fig. 6, and as in standard incandescent filament pyrometers, adjustment is made to the disappearance of the curved ends of filaments $G_1$ and $G_2$.

Instead of an incandescent filament placed directly in the path of the pyrometer ray, sources of comparative light may also be reflected by one of the well known optical methods from the side into the ray path, as denoted schematically in Fig. 7. Here, as in the familiar method, a slit Sp, illuminated by a source of comparative light G, is reflected via a reflector of prism R into the ray path.

A further improvement in the invention is as follows: In selective radiators, where the colour temperature does not agree with the true temperature, radiation is altered by inserting a colour filter $F_s$ (see Fig. 1), which attenuates one of the two spectral colours more strongly, so that the colour temperature read off the indicating instrument A agrees directly with the true temperature of the radiator S. A number of colour filters $F_s$ may be provided, so that with different selective radiators, such as molten steel, molten glass, salt baths etc., the true temperature of the radiator can be read off in each case on the colour temperature indicating instrument.

The method of measuring may be further perfected by providing several filter combinations $F_1$ and $F_2$ (Fig. 1), with which, in every colour temperature range, the greatest possible distance between the effective wave-lengths is obtained, without the luminous intensities of the colour fields assuming a value unfavourable to contrast sensitivity. Thus, for instance, at high colour temperatures, in lieu of red-green filters, a red-blue filter combination may be used, thus securing a higher degree of measuring precision, as this of course increases as the distance between the effective wavelengths increases.

Fig. 8 shows by way of example a suitable device for carrying the described method into practice. The colour filter $F_s$ placed behind the objective $L_1$ is designed to be adjustable, so that sets of filters can be used. Both the resistance W and the light attenuation device K may be set by turning the respective friction or bevel wheel $Z_2$ or $Z_3$. For this purpose, the shaft of a knob E is carried pivotably about a point O and bears a friction or bevel wheel $Z_1$, which is adapted to engage with one of the wheels $Z_2$ and $Z_3$. To supply the incandescent filament G with current, use is made of a battery B located in the handle of the instrument; this battery can be switched on by a press-button D. Between the lens $L_2$, which reproduces the incandescent filament G simultaneously with the radiator, and the eyepiece $L_3$ the two-part filter is placed, and there are provided here, at right angles to one another, pivotable about an axis P by means of a lever H, one red-green filter $F_1$ and one red-blue filter $F_{11}$.

The setting method takes place very simply in this pyrometer device as follows: Looking through the eyepiece $L_3$, one seeks the point of the radiator (S) to be measured, and the press-button D is depressed, whereby current is switched on: Next the luminous intensity is altered by means of the light attenuation device K, by turning the knob E in the direction $b$, pressing at the same time until the incandescent filament G has vanished from the red field of vision. If now with green it is lighter or darker than the radiator, the knob E is pressed in the direction $a$ and by rotating it, the colour temperature of the incandescent filament G is altered in the manner described above for Fig. 4, until the incandescent filament G in both colour fields 1 and 2 has become of the same luminous intensity as the radiator (S). The knob E is again pressed in direction $b$, making sure, by slowly turning grey wedge K, whether the incandescent filament G likewise disappears and appears, when on the pointer $A_1$ of the instrument A the colour temperature of the radiator S may be read off and on the scale SK associated with the grey wedge K the coefficient of emission.

By tilting the lever H in the direction of the arrow in Fig. 8, instead of the red-green filter $F_1$, the red-blue filter $F_{11}$ can be pivoted into the ray path, whereby at high colour temperatures, where the blue component of the radiation is sufficiently powerful, a high degree of accuracy in measuring can be obtained.

By inserting several colour filters $F_s$, the radiation for selectively radiating substances may be altered in such a manner that the colour temperature read off the instrument A, as is always the case with black body and green radiators, agrees with the true temperature of the body.

The colour filters $F_s$ may also be used for altering the ratio of the luminous intensity of the radiator for both measuring colours in such a way that with approximately constant luminous intensities a ratio corresponding to a lower colour temperature is obtained, and thus a higher emission ratio becomes apparent. This is always necessary when the colour emission property of the radiator S is less than that of the source of comparative light G, in which case luminosity matching would not be possible. The accuracy of measurement obtained by working according to the method of the invention is always greater than with the luminosity colour pyrometers proposed in the past, as the nature of the disappearance of the source of comparative light in the image of the radiator may be used as a criterion for the correct adjustment of the colour temperature of the source of comparative light. However, even in the most unfavourable case of the colour temperature not being correctly set, the accuracy of measurement is always greater than in the methods hitherto known. In this case, with continuous variation of the light attenuation device the source of comparative light is equal in luminous intensity to the radiator, but with a further slight light attenuation in one colour range it becomes lighter or darker than the radiator, while in the other colour field, to the eye it still appears equal in intensity to the radiator.

What I claim is:

A colour pyrometer for determining the temperature of an object comprising an optical system including lenses adapted to be directed toward said object, means for attenuating the intensity of the light from said object in said system, means for generating a comparison light source in the system, means for adjusting the intensity of said light source, a viewing means for conjointly observing the object and the light source, and a pair of colour filters of different colours arranged side by side in the field of vision in said system between the light source and the viewing means, the amount of the adjustments of the attenuating means and of the light source adjusting means when the light source becomes invisible to the observer through both filters serving respectively as indicator of the color emission property, and the temperature of said object.

ADOLF JAGERSBERGER.

REFERENCES CITED

The following references are of record in the file of this patent:

UNITED STATES PATENTS

| Number | Name | Date |
|---|---|---|
| 735,423 | Taylor et al. | Aug. 4, 1903 |
| 1,283,717 | Foote et al. | Nov. 5, 1918 |
| 1,376,666 | Bash | May 3, 1921 |
| 2,049,260 | Hase | July 28, 1936 |
| 2,218,253 | Weaver | Oct. 15, 1940 |

FOREIGN PATENTS

| Number | Country | Date |
|---|---|---|
| 147,146 | Great Britain | June 23, 1921 |
| 503,243 | Germany | July 19, 1930 |
| 715,580 | France | Sept. 28, 1931 |